United States Patent [19]
Ward et al.

[11] Patent Number: 5,274,600
[45] Date of Patent: Dec. 28, 1993

[54] FIRST-IN FIRST-OUT MEMORY

[75] Inventors: Morris D. Ward, Garland; Jy-Der Tai, Plano; Kenneth L. Williams, Richardson, all of Tex.

[73] Assignee: Texas Instruments Incorporated, Dallas, Tex.

[21] Appl. No.: 626,918

[22] Filed: Dec. 13, 1990

[51] Int. Cl.⁵ .................. G11C 13/00; G11C 11/40
[52] U.S. Cl. .................. 365/221; 365/189.01; 365/189.04
[58] Field of Search .............. 365/221, 189.01, 189.02, 365/189.04, 189.05, 230.01

[56] References Cited

U.S. PATENT DOCUMENTS 5,025,422 6/1991 Moriwaki et al. ............. 365/233.5
5,031,149 7/1991 Matusumoto et al. ........ 365/189.11

OTHER PUBLICATIONS

"CMOS Parallel Synchronous FIFO 512×18-Bit & 1024×18-Bit," by Integrated Device Technology, Incorporated, Jul. 1990, pp. 1-15.
"CMOS Parallel Sync FIFO (Clocked FIFO) 512×18-Bit and 1024×18-Bit," Paper 6.13, Integrated Device Technology, Inc., Aug. 1990, pp. 1-22.

Primary Examiner—Terrell W. Fears
Attorney, Agent, or Firm—Thomas G. Eschweiler; James C. Kesterson; Richard Donaldson

[57] ABSTRACT

A sequential memory (10) includes synchronous write control circuitry (26) and synchronous read control circuitry (22). The synchronous write control circuitry produces an Input Ready (IR) signal synchronous with the WRTCLK signal. The synchronous read control circuitry (22) generates a Output Ready (OR) signal synchronously with the RDCLK signal. A RSAM (read sense amplifier) signal is provided to read the sense amplifier associated with a memory (12) responsive to the RDCLK if a RAMRDY signal indicates that a read from this location may be requested on the next clock cycle.

8 Claims, 2 Drawing Sheets

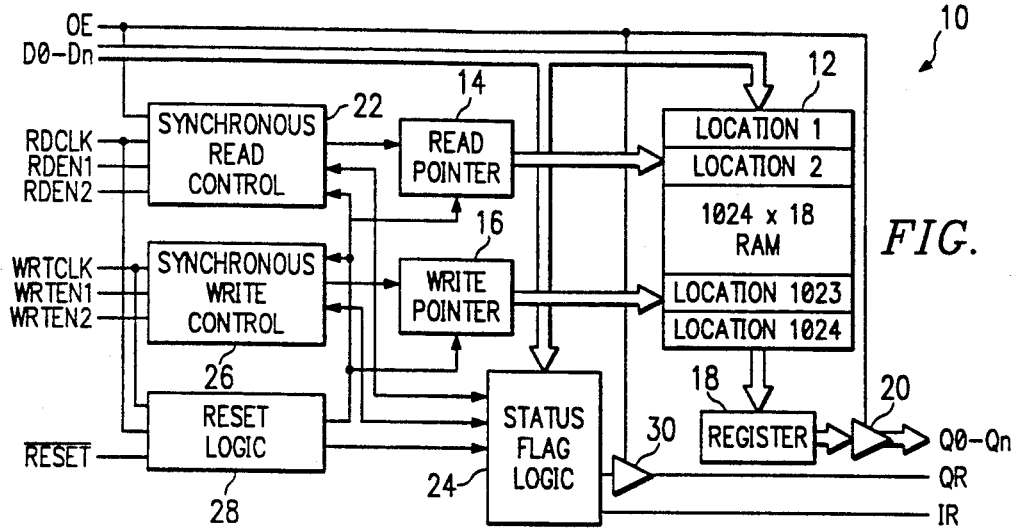
*FIG. 1*
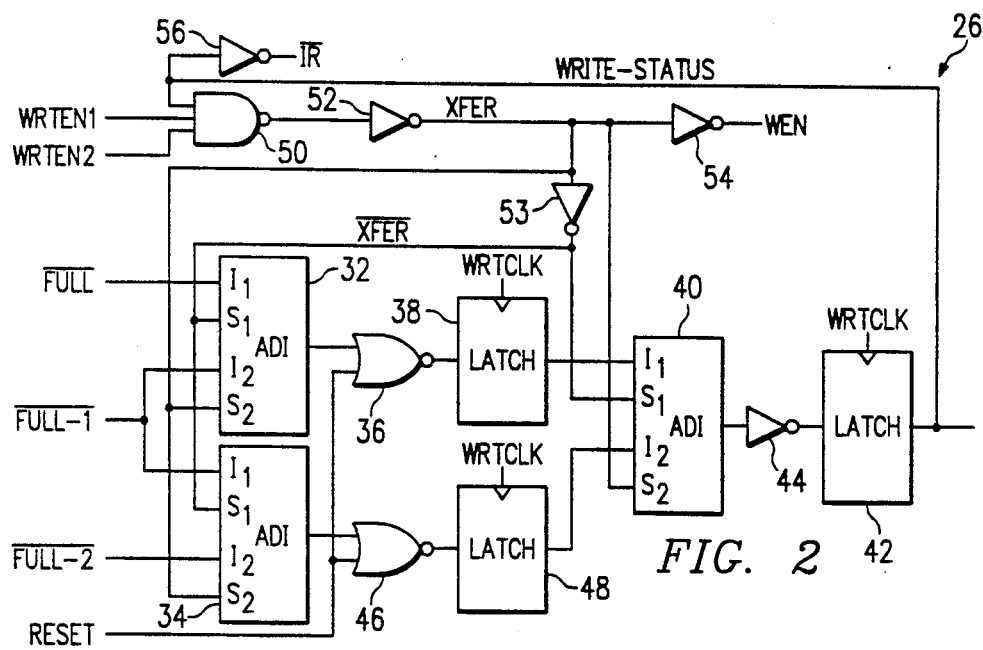
*FIG. 2*
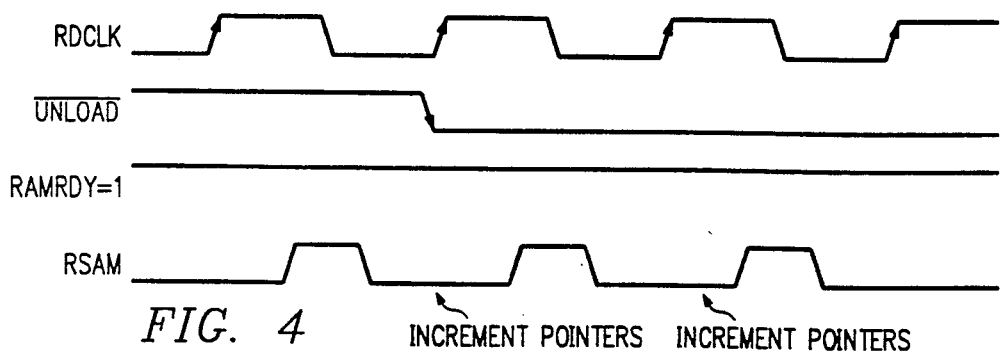
*FIG. 4*   INCREMENT POINTERS   INCREMENT POINTERS

FIRST-IN FIRST-OUT MEMORY

TECHNICAL FIELD OF THE INVENTION

This invention relates in general to electronic circuits, and more particularly to a first-in, first-out memory.

BACKGROUND OF THE INVENTION

Sequential memories, such as FIFOs and LIFOs, are often used as a buffer between circuits. These memories are referred as sequential because data is output in a predetermined sequence corresponding to the order in which it was input. Sequential memories allow circuits operating at different input/output speeds to communicate with one another. Early sequential memories comprise shift registers which serially stored incoming data units at a desired speed and read out the stored data units at a different speed. Generally, shift register implementations of sequential memories are of limited storage and have unacceptable delay times, and therefore, are unsuitable for many operations. More recently, random access memories have been developed in which pointers are used to implement the first-in, first-out or last-in, last-out I/O sequence.

One problem with random access implementations of sequential memories is that the status generators used to generate flags regarding the status of the memories (such as FULL and EMPTY) are not synchronous with either the READ or WRITE clocks, and therefore the signals may result in a metastable condition. Metastability is a phenomena which occurs in any device which has clocked latches where the data input and clock are not synchronized. Normally a latch will latch a state of either low or high but statistically can latch at a state which is neither low nor high. This metastable state may continue for some time and is therefore undesirable.

One method of reducing the occurrence of metastable conditions is to propagate the status flags through two or more stages which are synchronized to a clock. This method assumes that if a metastable state occurs in the first stage, it will resolved by the second stage. A consequence of the two-stage synchronizing buffer is that flags are delayed from their destination by the stages. Consequently, the data access times may be greatly reduced.

Therefore, a need has arisen for a metastable resistant sequential memory having decreased data access times.

SUMMARY OF THE INVENTION

In accordance with the present invention, a sequential memory is provided which substantially eliminates the disadvantages of prior sequential memories.

The sequential memory of the present invention includes a memory for storing data units. Circuitry is provided for sampling the memory responsive to a control signal indicating that the memory has data available for reading. The sampled data is output responsive to a read request.

The present invention provides a technical advantage of enhanced speed. Since the data is sampled prior to a read request, it may be output almost immediately after receiving such request. Therefore, the delays associated with reading the memory after receiving a read request are eliminated.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrated a block diagram of the sequential memory of the present invention;

FIG. 2 illustrates a schematic representation of the synchronous write control circuitry;

FIG. 4 illustrates timing diagrams illustrating the read ahead portion of the synchronous read control circuitry.

DETAILED DESCRIPTION OF THE INVENTION

Figure 3:
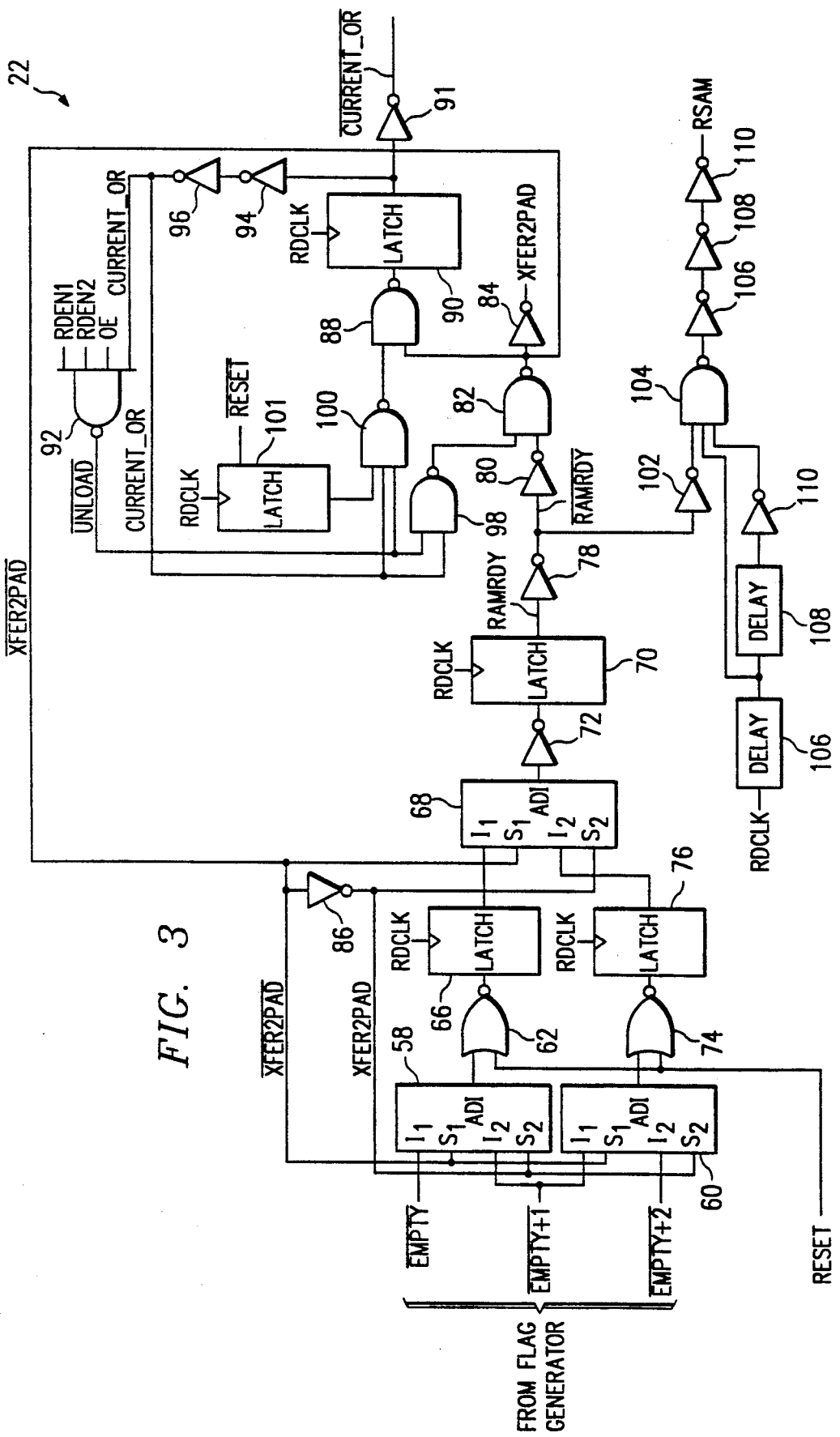
FIG. 3 illustrates a schematic representation of the synchronous read control circuitry.

The preferred embodiment of the present invention and its advantages are best understood by referring to FIGS. 1-4 of the drawings, like numerals being used for like and corresponding parts of the various drawings.

FIG. 1 illustrates a functional block diagram of the sequential memory 10. A RAM memory 12 is coupled to data input signals D0-Dn, read pointer circuitry 14, write pointer circuitry 16 and output register 18. Tristate buffer 20 is connected to the output of register 18 and to an Output Enable (OE) signal. Synchronous read control circuitry 22 is coupled to the read pointer 14 and to status flag logic 24. Synchronous write control circuitry 26 is connected to write pointer circuitry 16 and to status flag logic 24. RESET logic 28 is connected to read pointer circuitry 14, write pointer circuitry 16, status flag logic 24, synchronous read control circuitry 22 and synchronous write control circuitry 26. Status flag logic 24 outputs an Output Ready (OR) signal via buffer 30, which is controlled by the OE signal. Synchronous read control circuitry 22 receives the read clock (RDCLK), Read Enable 1 (RDEN1) and Read Enable 2 (RDEN2) signals. Synchronous write control circuitry 26 receives the write clock (WRTCLK), Write Enable 1 (WRTEN1) and Write Enable 2 (WRTEN2) signals.

Tristate buffer 20 outputs the data output signals, Q0-Qn. Status flag logic 24 also outputs the Input Ready (IR) signal.

The $\overline{\text{RESET}}$ signal is used to reset the sequential memory 10 into a initial state. The Write Enable signals, WRTEN1 and WRTEN2, must be set high in order to write a word into memory. Similarly, the Read Enable signals, RDEN1 and RDEN2, must be high before the rising edge of RDCLK to read a word out of memory. The Read and Write Enable signals are used to couple to sequential memories together to form a larger sequential memory. WRTCLK is used to initiate the storage of a data input into the RAM memory 12. Data is written into the memory on a low-to-high transition of WRTCLK if the IR status flag and the WRTEN control signals are high. As described in greater detail in connection with FIG. 2, the IR status flag is driven synchronously with respect to the WRTCLK signal. Data is read out of memory 12 on a low-to-high transition of the RDCLK input if the OR status flag, OE signal, and the RDEN control signals are high. The OR flag is driven synchronously with respect to the RDCLK signal as described in greater detail in connection with FIG. 3. The OE signal places the data out (Q0-Qn) and OR flag at a high impedance state when OE is low. OE must be at a high before the rising edge of RDCLK to read a data unit from memory 12.

The IR flag is high when the sequential memory 10 is not full and is low when the device is full. After the sequential memory 10 is filled, and IR is set low, IR is set high on the second WRTCLK pulse to occur after the first valid read. The OR flag is high when the FIFO is not empty and low when it is empty. The OR flag is set high on the rising edge of the third RDCLK pulse to occur after the first word is written into the sequential memory 10. OR is set low on the rising edge of the first RDCLK pulse after the last word is read.

In the illustrated embodiment, RAM memory 12 comprises a 1024×18 random access memory. However, other memory sizes and configurations could be provided without change to the present invention.

In operation, synchronous write control circuitry 26 synchronizes the IR flag with the WRTCLK signal. Similarly, synchronous read control circuitry 22 synchronizes the OR flag to RDCLK. The synchronous read and synchronous write control circuits control the read and write pointer circuits 14 and 16 to read data from and write data to the memory 12.

Status flag logic 24 generates flags regarding operation of the sequential memory 10 based on data from the synchronous read control circuit 22, synchronous write control circuit 26, and reset logic 28. A preferred embodiment of the status flag logic 28 is described in connection with U.S. patent application Ser. No. 07/393,440, entitled "Programmable Status Flag Generator FIFO", to Williams et al., filed Aug. 14, 1989.

FIG. 2 illustrates a schematic representation of the synchronous write control circuitry 26. The synchronous write control circuit 26 receives $\overline{\text{FULL}}$, $\overline{\text{FULL-1}}$ and $\overline{\text{FULL-2}}$ signals from the status flag logic 24. The $\overline{\text{FULL}}$ signal is high when the memory is not full. The $\overline{\text{FULL-1}}$ signal is high when the memory 12 has at least two free locations. The $\overline{\text{FULL-2}}$ signal is high when the memory 12 has at least three available locations. The synchronous write control circuit 26 also receives a $\overline{\text{RESET}}$ signal from the RESET logic 28.

AOI circuit 32 inputs the $\overline{\text{FULL}}$ signal into its first input ($I_1$) and the $\overline{\text{FULL-1}}$ signal into its second input ($I_2$). AOI circuit 34 inputs the $\overline{\text{FULL-1}}$ signal into its first input and the $\overline{\text{FULL-2}}$ signal into its second input. The output of the AOI circuit 32 is coupled to NOR gate 36, along with the RESET signal. The output of NOR gate 36 coupled to latch 38, which is clocked by the WRTCLK signal. The output of latch 38 is input to the first input of AOI circuit 40. The output of AOI circuit 40 is coupled to latch 42 via a inverter 44. Latch 42 is also clocked by the WRTCLK signal. The output of AOI circuit 34 is connected to the input of NOR gate 46, along with the RESET signal. The output of NOR gate 46 is input to latch 48 which is clocked by the WRTCLK signal. The output of latch 48 is connected to the second input of AOI circuit 40. The output of latch 42 is coupled to a NAND gate 50 along with the WRTEN1 and WRTEN2 signals. The output of NAND gate 50 is connected to inverter 52. The output of inverter 52 comprises the XFER signal. XFER is coupled to inverter 53 which outputs $\overline{\text{XFER}}$. $\overline{\text{XFER}}$ is connected to the first select inputs (S) of AOI circuits 32, 34 and 40. The XFER signal is connected to the second select inputs ($S_2$) of AOI circuits 32, 34 and 40. An inverter 54 inputs the XFER signal and outputs a WEN (Write Enable) signal. The output of latch 42 is also connected to an inverter 56. The output of inverter 56 is the synchronized $\overline{\text{IR}}$ signal.

In operation, the synchronous write control circuit 26 creates an Input Ready (IR) signal which is generated synchronously to the WRTCLK signal. The synchronous write control circuitry 26 uses two stages of latches, the first comprising latches 38 and 48 and the second comprising latch 40, in order to minimize metastable events. AOI circuits 32, 34 and 40 are used to ensure that the IR signal is correct, since the NOT FULL signal must propagate through to stages of latches, thereby creating a delay from generation of the $\overline{\text{FULL}}$ signal by the status flag logic 24 and the output of WRITE_STATUS by latch 42.

AOI circuits perform as follows: $I_1$ is ANDed with $S_1$ and $I_2$ is ANDed with $S_2$; the results of the AND operations are ORed together and the result is inverted. Since $S_1$ will always be the complement of $S_2$ for all the AOI circuits, the output of each AOI circuit will be an inversion of $I_1$ if $S_1$ is high or an inversion of $I_2$ if $S_2$ is high.

In operation, the synchronous write control circuit 26 predicts the proper value for IR based on the $\overline{\text{FULL}}$, $\overline{\text{FULL-1}}$ and $\overline{\text{FULL-2}}$ signals. Assuming that the latches 38, 48 and 42 initially store a low value, if a high $\overline{\text{FULL}}$ signal propagates to latch 42, the value of XFER will toggle, thereby causing the $\overline{\text{FULL-1}}$ flag to be stored in latch 42 on the next clock cycle. Hence, if the $\overline{\text{FULL-1}}$ flag is low, indicating that only one storage location is available for input, the IR flag will be high for only one clock cycle. Similarly, if the $\overline{\text{FULL-1}}$ flag is high and the $\overline{\text{FULL-2}}$ flag is low, indicating two storage locations are available for input, the $\overline{\text{FULL-2}}$ flag will be stored in latch 42 on the subsequent WRTCLK cycle, thereby generating a high IR signal for two clock cycles. The WEN signal is used internally by the sequential memory 10 to allow writing into the memory location pointed to by the write pointer circuitry 16.

FIG. 3 illustrates a schematic representation of the synchronous READ control circuitry 22. The synchronous READ control circuitry 26 receives $\overline{\text{EMPTY}}$, $\overline{\text{EMPTY+1}}$ and $\overline{\text{EMPTY+2}}$ flags from the flag generator 24. The $\overline{\text{EMPTY}}$ flag is input to the first input of an AOI 58. The $\overline{\text{EMPTY+1}}$ flag is input to the second input of AOI 58 and to the first input of AOI 60. The $\overline{\text{EMPTY+2}}$ flag is input to the second input of AOI 60. NOR gate 62 receives the output of AOI 58 and the RESET signal. The output of NOR gate 62 is input to a latch 66 which is clocked by the RDCLK signal. The output of latch 66 is connected to AOI 68. The output of AOI 68 is coupled to latch 70 via inverter 72. Latch 70 is clocked by the RDCLK signal. The output of AOI 60 is input to NOR gate 74 along with the RESET signal. The output of NOR gate 74 is input to latch 76 which is clocked by the RDCLK signal. The output of latch 76 is coupled to the second input of AOI 68.

The output of latch 70 comprises the RAMRDY (Ram Ready) signal. The RAMRDY signal is input to inverter 78. The output of inverter 78 is coupled to inverter 80. The output of inverter 80 is coupled to one input of a NAND gate 82. The output of NAND gate 82 comprises the $\overline{\text{XFER2PAD}}$ signal. The output of NAND gate 82 is coupled to inverter 84, which outputs the XFER2PAD signal. The $\overline{\text{XFER2PAD}}$ signal is coupled to the first select inputs of AOI circuits 58, 60 and 68. An inverter 86 is coupled to the $\overline{\text{XFER2PAD}}$ signal. The output of inverter 86 is coupled to the second select inputs of AOI circuits 58, 60 and 68.

Further, the $\overline{\text{XFER2PAD}}$ signal is coupled to an input of NAND gate 88. The output of NAND gate 88 is connected to a latch 90 which is clocked by the RDCLK signal. The output of latch 90 is coupled to an inverter 91 and to a NAND gate 92 via inverters 94 and 96. The output of inverter 91 is the $\overline{\text{CURRENT\_OR}}$ flag which is used by the status flag logic to generate the OR flag. The output of inverter 96 is also coupled to NAND gates 98 and 100. The output of NAND gate 92 (the $\overline{\text{UNLOAD}}$ signal) is also coupled to inputs of NAND gates 98 and 100. Further, the $\overline{\text{RESET}}$ signal (from reset logic 28) is coupled to NAND gate 100 via latch 101. The output of NAND gate 98 is coupled to the other input of NAND gate 82. The output of NAND gate 82 and the output of NAND 100 are coupled to the inputs of NAND gate 88. NAND gate 92 also receives the RDEN1, RDEN2 and OE signals, which are input to the sequential memory 10.

The $\overline{\text{RAMRDY}}$ signal is input to inverter 102. The output of inverter 102 is coupled to NAND gate 104. The RDCLK is coupled to delay circuit 106 (which may comprise a plurality of serially connected inverters). The output of delay circuit 106 is coupled to another input of NAND gate 104 and to delay circuit 108. The output of delay circuit 108 is coupled to NAND gate 104 via inverter 110. The output of NAND gate 104 is coupled to serially connected inverters 106, 108 and 110. The output of inverter 110 comprises the RSAM (read sense amp) signal.

In operation, the CURRENT_OR signal is used to indicate whether a memory location is available for reading. The CURRENT_OR signal is synchronized to the RDCLK signal.

So long as the $\overline{\text{UNLOAD}}$ signal is high and CURRENT_OR is high, the CURRENT_OR signal remains in its current state, since reading is disabled if any of the inputs to NAND gate 92 are low. If either the $\overline{\text{UNLOAD}}$ signal or CURRENT_OR signal is low, however, the CURRENT_OR signal will change based on the value of the RAMRDY signal, the RAMRDY signal may indicate whether CURRENT_OR will be high or low on the next clock cycle.

Referring to FIGS. 3 and 4, the RAMRDY signal is used to form a look-ahead-READ function implemented by NAND gate 104 and delay circuits 106 and 108. The RSAM connected to the read pointer circuitry and is operable to initiate a reading of the next memory location to be read in memory 12 by activating its associated sense amplifiers. The RSAM signal will be pulsed high when the RAMRDY flag is high, the RDCLK signal as delayed by a first time period is high and the RDCLK signal as delayed by a second time period is also high. The RSAM signal causes the sense amplifiers to be read any time there is data in memory, even though the $\overline{\text{UNLOAD}}$ signal may indicate that the memory is not currently ready to be read at the output. The output in the sense amplifier is not sent to the output register 18 until the XFER2PAD signal transitions to a high state.

Consequently, the RSAM signal samples the next memory location to be read responsive to the RDCLK cycle. The memory location is read only if the RAMRDY signal is high, indicating that the next RDCLK cycle could potentially result in a read from memory. Consequently, if the next read cycle does result in a read from memory (i.e., $\overline{\text{UNLOAD}}$ transition is low prior to the active edge of the next RDCLK cycle), the memory 12 will have been read and the data unit stored therein will be available for immediate transfer to the output buffer. If the sense amplifiers were not read prior to the $\overline{\text{UNLOAD}}$ signal transitioning low, there would be a delay involved in reading the memory and subsequently transferring the data to the output register 18.

The delay circuits 106 and 108 provide a time period in which the read pointer circuitry 14 may increment the pointers prior to the next reading the sense amplifier when RSAM transitions high.

The aforementioned look-ahead-read greatly enhances the speed of the circuit because the next available location is read responsive to each RDCLK cycle if the RAMRDY signal indicates that the memory location could potentially be read on the next clock cycle.

While the present invention has been described in connection with a FIFO, other sequential memories such as LIFOs could be similarly implemented with the present invention as defined in the claims.

Although the present invention and its advantages have been described in detail, it should be understood that various changes, substitutions and alterations can be made herein without departing from the spirit and scope of the invention as defined by the appended claims.

What is claimed is:

1. A sequential memory, comprising:
   a RAM memory having a first memory location and a next second memory location, the first memory location being output in response to receiving a read clock control signal; and
   look ahead read circuitry connected to the RAM memory and coupled to the read clock control signal to sample the next second memory location responsive to the received read clock control signal.

2. The sequential memory of claim 1 wherein said sampling circuitry comprises circuitry for generating a sensing signal to said memory.

3. The sequential memory of claim 2 wherein said sampling circuitry is operable to generate said sensing signal after a predetermined delay.

4. A method of retrieving information from a sequential memory, comprising the steps of:
   storing a first data unit in a first memory location of a sequential memory;
   storing a second data unit in a second next memory location of the sequential memory;
   receiving a request to read data;
   outputting the first data unit stored in the first memory location responsive to the request to read data; and
   sampling the second data unit stored in the second next memory location responsive to receiving the request to read data.

5. The method of claim 4 wherein said sampling step comprises the step of generating a sense signal to said memory.

6. The method of claim 5 and further comprising the step of generating an output ready signal synchronous with receiving a read clock request signal.

7. The method of claim 6 wherein said step of generating an output ready signal comprises the step of propagating control signals indicative of the number of data units operable to be read through at least two stages.

8. The method of claim 7 and wherein said sampling step comprises the step of sampling said data responsive to the output of one of the stages.

* * * * *